United States Patent [19]

Valbjorn

[11] 4,430,900
[45] Feb. 14, 1984

[54] PRESSURE RESPONSIVE SWITCHING DEVICE PARTICULARLY PRESSOSTAT OR THERMOSTAT

[75] Inventor: Knüd V. Valbjorn, Nordborg, Denmark

[73] Assignee: Danfoss A/S, Nordborg, Denmark

[21] Appl. No.: 334,582

[22] Filed: Dec. 28, 1981

[30] Foreign Application Priority Data

Jan. 19, 1981 [DE] Fed. Rep. of Germany ....... 3101448

[51] Int. Cl.³ .......................... G01L 7/06; G01L 9/02
[52] U.S. Cl. ........................................ 73/701; 73/723
[58] Field of Search ................. 73/701, 755, 753, 384, 73/386, 708, 723

[56] References Cited

U.S. PATENT DOCUMENTS

| | | | |
|---|---|---|---|
| 2,511,752 | 6/1950 | Tandler et al. ........................ | 73/701 |
| 2,798,191 | 7/1957 | Brailsford ............................. | 73/701 |
| 3,590,638 | 7/1971 | Anastasia ............................. | 73/701 |
| 3,738,356 | 6/1973 | Workman ............................. | 73/701 |

*Primary Examiner*—Donald O. Woodiel
*Attorney, Agent, or Firm*—Wayne B. Easton

[57] ABSTRACT

A pressure responsive switching device, particularly a pressostat or thermostat, comprises an actuating element (5) which is loaded in one direction by an operating element (1) at the pressure and in the other direction by a main spring (9) by way of a force transmission device (10). The latter has a physical quantity ($P_k$) which is variable with the force transmitted by the operating element. In addition, there is a measured value generator (23) which, depending on this physical quantity, delivers an electric analogue signal (S). The force transmission device may comprise a compensating force producer (10) in the form of an expansion element (15) which is provided with a liquid-vapor filling and a heating device (21), by which the compensating force of the force of the operating element (1) is made to follow. In this way, the switching device can deliver an analogue signal (S) corresponding to the system pressure (P) by using the same operating element (1).

13 Claims, 5 Drawing Figures

PRESSURE RESPONSIVE SWITCHING DEVICE PARTICULARLY PRESSOSTAT OR THERMOSTAT

The invention relates to a pressure responsive switching device, particularly a pressostat or thermostat, comprising an actuating element which is loaded in one direction by an operating element at the pressure and in the other direction by a main spring and which, on reaching a releasing position, operates a contact.

Pressostats which perform a switching operation in response to the pressure in an installation, for example the pressure of the refrigerant in a refrigerator, or thermostats which perform a switching operation in response to a temperature-dependent vapour pressure are known in multifarious forms. In addition to the main spring and operating element, the actuating element can be engaged by still further systems, e.g. a differential spring system. They all have the common feature that they operate a contact when the pressure exceeds or falls below a given pressure. The releasing pressures are generally adjustable. The movement of the actuating element is often limited by abutments in the switching path of the contact system so that neither the switching device nor the operating element can be overloaded by an excessive pressure of the operating element or the main spring, respectively. It is also known to measure pressures in an analogue manner so as to display same or further to process them within the scope of a regulation or control. For this purpose one requires a suitable pressure measuring box, i.e. a second operating element and an appropriate measuring device.

The invention is based on the problem of providing a switching device of the aforementioned kind, with the aid of which the pressure can also be analogously measured so that it is necessary to connect only one appliance to one operation element at the system under pressure.

This problem is solved according to the invention in that the force path between the operating element and main spring includes a force transmission device having a physical quantity variable with the force transmitted by the operating element, and that the force transmission device is associated with a measured value generator which emits an electric analogue signal in response to this physical quantity.

In this construction, the analogue signal is obtained with the aid of the force transmission device through which the force of the operating element is passed. This force transmission device is an addition but does not influence the function of the switching device. More particularly, the actuating element need only carry out a small stroke which corresponds to the contact path and is predetermined by abutments. In each case, the force of the operating element is converted within the force transmission device to a different physical quantity from which an electric analogue signal can then be readily derived. Altogether, one obtains a unitary appliance with a double function which needs to be connected to only one operating element at a single position of the system under pressure.

In one embodiment, the force transmission device is a force storer of which the mechanical condition is affected by the force transmitted by the operating element, and the measured value generator is an electromechanical converter. The force of the operating element is here converted directly into that physical quantity from which the measured value is derived. This results in a particularly simple construction. For example, the force transmission device may be a leaf spring and the electromechanical converter a strain gauge. It is even possible for the actuating element itself to be in the form of a leaf spring.

Another preferred embodiment comprises a force transmission device with a compensating force generator having a regulating circuit which causes the compensating force to follow the force of the operating element, whilst the measured value generator converts a physical quantity of this regulating circuit into an electric analogue signal. This embodiment, when employing abutments limiting the stroke of the actuating element, has the advantage over a force storer that the pressure face of the operating element retains its position at variable pressures, with the exception of the releasing pressure, whereby measuring errors caused by a changing spring force of operating bellows or by a change of the pressure area are eliminated.

For example, the compensating force generator may be an electromagnet and the measured value generator can derive the electric analogue signal from the exciter current or an electric quantity which controls same. An electromagnetic compensating force producer for measuring purposes is known per se from U.S. Pat. Ser. No. 3,908,460 wherein, however, the magnetic core or the exciter coil are stationary.

With particular advantage, the compensating force generator is an expansion element which is provided with an electric heating device and which has a box provided with bellows or a diaphragm and a vapour filling, preferably a liquid-vapour filling, and the measured value generator measures the temperature of the vapour filling. In this way, the pressure to be measured can very simply be converted into a pressure-dependent electric temperature signal.

The heating device can, for example comprise a heating coil surrounding the box. The box therefore serves as a coil body to provide a secure seating for the heating coil.

Further, the heating device may be operated by a switch of which both contacts are coupled to a respective end face of the box, the end faces facing the main spring or operating element and being movable relatively to each other. The heating device is in this case actuated by a simple two-point control with which a defined spacing is maintained between the two end faces of the box.

If the path of the actuating element is limited by an abutment at least on one side of the releasing position and in the vicinity thereof, the at least one abutment may co-operate with the part of the expansion element coupled to the main spring and the actuating element may be disposed between the operating element and the expansion element. In this case the expansion element is at the same time used as the element co-operating with the abutment.

The measured value generator is preferably a temperature-dependent resistor or a thermo-element.

In a preferred embodiment, the electric heating device has a temperature-dependent heating resistor which also serves as measured value generator, and an electronic circuit measures resistance after the heating current has been switched off. One therefore requires only two leads to the expansion element, by way of which the heating energy is supplied and the measuring signal is derived.

The invention will now be described in more detail with reference to a preferred example illustrated in the drawing, wherein.

Figure 1:
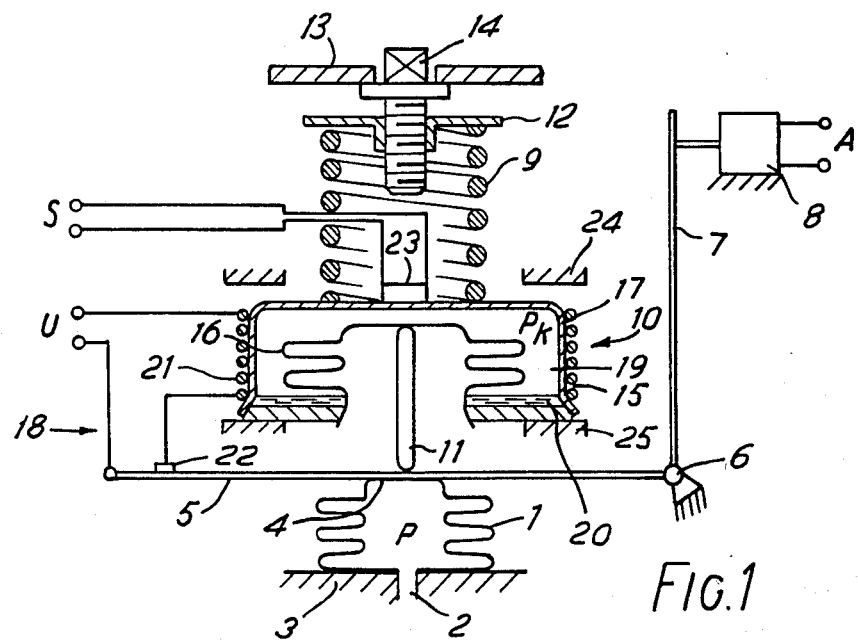
FIG. 1 is a diagrammatic section through a first embodiment of the switching device according to the invention.

FIG. 1 shows an operating element 1 in the form of a bellows box at a pressure P and connected to the pressure system by a conduit 2. The underside of the operating element is held on a supporting surface 3. The top forms a movable wall 4 of which the face is subjected to the pressure P. The movable wall acts on an actuating element 5 in the form of an angular lever pivotable about a fixed hinge, the free arm 7 being adapted to actuate a contact system 8 to deliver a switching signal A. On the other side, the actuating element 5 is acted on by a main spring 9 with the interpositioning of a force transmission device 10 and a tappet 11. The mainspring 9 is supported on a counterbearing 12 which, with the aid of an adjusting screw 14 held at a housing wall 13, is axially adjustable to set the releasing pressure.

The force transmission device 10 comprises a compensating force producer 15 comprising a box 17 provided with corrugated bellows 16 and an associated regulating circuit 18. The box contains a chamber 19 which is partially filled with a vaporisable liquid 20 so that in the space thereabove there is a compensating vapour pressure $P_k$. The box is provided with a heating device in the form of a heating coil 21 which is wound about the box periphery and applied to a voltage U by way of a switch 22. An electric temperature sensor 23 in the form of a thermo-element lies against the box and delivers an electric analogue signal S. In addition, there is a fixed upper abutment 24 and lower abutment 25 for the box 17.

The apparatus as described operates as follows. At low pressures P in the system, the box 17 is pressed by the main spring 9 against the lower abutment 25. As long as the compensating pressure $P_k$ produces a lower force than the force corresponding to the operating element 1 under the influence of the pressure P, the switch 22 is closed. The heating device 21 heats the liquid 20, whereby the vapour pressure $P_k$ rises. As soon as a compensating force has been reached which exceeds the force of the operating element 1, the switch 22 will open. The heating device is switched off. The vapour cools and the cycle is repeated. In this way, the vapour is held at a temperature which accurately follows the compensating force of the force of the operating element 1. This temperature is measured by the measured value generator 23 in the form of a temperature sensor, so that one can derive the analogue signal S which corresponds to the pressure P. As soon as the force of the operating element 1 and thus the force of the force transmitting device 10 exceeds the desired value of the spring force, the entire pressure box 17 will move upwardly until it strikes the abutment 24. The actuating element 5 is thereby pivoted and the contact system 8 actuated. Upon a further rise in the pressure P of the system, the force transmitting device 10 operates in the same way as before.

Figure 2:
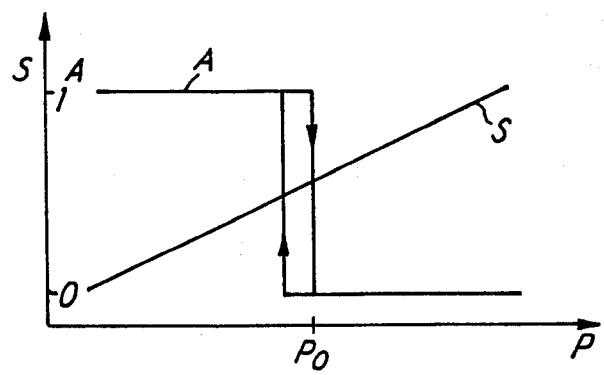
FIG. 2 is a graph showing the analogue measuring signal S and the switching signal A plotted against the system pressure P.

FIG. 2 shows that the analogue signal S increases continuously with an increase in the system pressure P. The switching signal A, however, is released at a predetermined system pressure $P_o$. By reason of hysteresis, resetting takes place at a somewhat lower value. This value $P_o$ can be adjusted at will with the aid of the adjusting screw 14. Similarly, a conventional high-pressure pressostat or low-pressure pressostat as used for refrigeration installations can assume the pressure indication as a second function.

Figure 3:
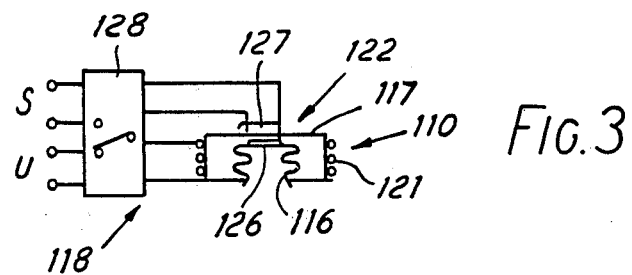
FIG. 3 is a diagram showing a modified embodiment of a force transmission device.

In the FIG. 3 embodiment, a force transmission device 110 again comprises a box 117 with a liquid-vapour filling and corrugated bellows 116. A heating coil 121 on the outside consists of thermo-elementary material. A proximity switch 122 comprises a permanent magnet 126 within the box and a magnetic flux-dependent switching device 127 on the outside. Depending on this switching device 122, the voltage U is appkied to or removed from the heating coil 121. Further, there is an electronic circuit 128 which measures the resistance of the heating coil 121 shortly after removal of the voltage and delivers this measured value either directly or indirectly as an electric analogue signal S. In order that the heating coil assumes the temperature of the vapour in the box 117 and is thus adapted to deliver an electric temperature signal corresponding to the pressure, a waiting time in the order of 1 second, for example 0.5–5 seconds, will be sufficient.

Figure 4:
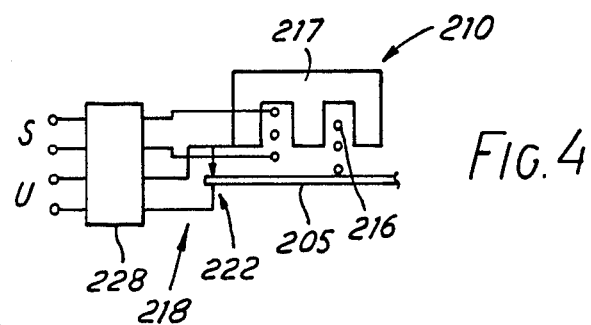
FIG. 4 shows a third embodiment of a force transmission device.

In the embodiment of FIG. 4, there is a force transmission device 210 which comprises a magnetic core 217 and a magnetic coil 216. The latter is connected to the actuating element 205. A switch 222 determines whether the magnetic compensating force is equal to the force of the operating element 1 and, in dependence thereon, regulates the size of the exciter current. In the switch 222, the one contact is fixed to the magnetic core 117 and the other is fixed to the actuating element 205. An electronic circuit 228 on the one hand regulates the exciter current depending on the desired compensating force and on the other hand delivers an analogue signal S depending on this exciter current.

Figure 5:
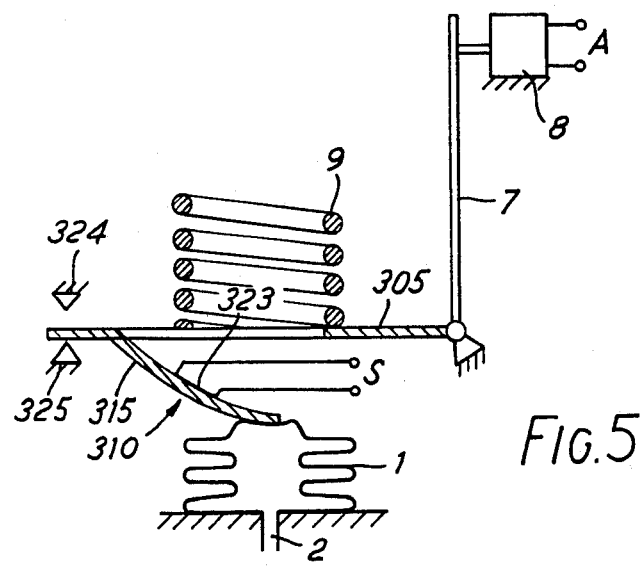
FIG. 5 illustrates a further embodiment with the essential integers of the switching device according to the invention.

The force transmitting device 310 in the embodiment of FIG. 5 is a force storer in the form of a leaf spring 315. It is made in one piece with the actuating element 305 and formed by stamping and bending out a lug. A strain gauge 323 serves as the electromechanical converter from which an electric analogue signal S can be tapped which depends on the amount of flexing and thus the force of the operating element 1. In this embodiment, two abutments 324 and 325 fixed with respect to the housing co-operate with the actuating element 305.

I claim:

1. A pressure responsive switching device such as a pressostat or thermostat, comprising, an operating element subject to an operating pressure, contact switch means for operating equipment externally of said switching device, an actuating element for operating said switch means which is loaded in one direction by said (an) operating element (subject to an operating pressure) and in the other direction by a main spring, (a contact) said switching means being operable by said actuating element after a predetermined displacement thereof, a force path between said operating element and said main spring including (a) an auxiliary force transmission device having a physical response quantity variable with a force transmitted thereto by said operating element, and a measured value generator connected to said force transmission device which emits an electric analog signal in response to said physical quantity.

2. A device according to claim 1, characterized in that said force transmission device is a force storer of which the mechanical condition is affected by a force transmitted by said operating element, said measured value generator being an electromechanical converter.

3. A device according to claim 2, characterized in that said force transmission device is a leaf spring and said electromechanical converter is a strain gauge.

4. A device according to claim 3, characterized in that said actuating element is in the form of a leaf spring.

5. A device according to claim 1, characterized in that said force transmission device includes a compensating force generator with a regulating circuit which causes said compensating force to follow the force of said operating element, and said measured value generator converting a physical quantity of said regulating circuit into an electric analog signal.

6. A device according to claim 5, characterized in that said compensating force generator is an electromagnet and said measured value generator derives said electric analog signal from an electric qiuantity which controls same.

7. A device according to claim 5, characterized in that said compensating force generator is an expansion element which is provided with an electric heating device (21;121) and which has a box provided with a diaphragm means and a vapor filling, said measured value generator measuring the temperature of said vapor filling.

8. A device according to claim 7, characterized in that said heating device comprises a heating coil surrounding said box.

9. A device according to claim 7, characterized in that said heating device is operated by a switch of which both contacts are coupled to a respective end face of said box, said end faces facing said main spring or said operating element being movable relatively to each other.

10. A device according to one of the claims 7 to 9 in which the path of said actuating element is limited by an abutment at least on one side of the releasing position and in the vicinity thereof, at least one said abutment being cooperable with the part of said expansion element coupled to said main spring, said actuating element being disposed between said operating element and said expansion element.

11. A device according to claim 7, characterized in that said measured value generator is a temperature-dependent resistor.

12. A device according to claim 7, characterized in that said measured value generator is a thermo-element.

13. A device according to claim 7, characterized in that said electric heating device has a temperature-dependent heating resistor which also serves as said measured value generator and that an electric circuit measures said resistance after said heating current has been switched off.

* * * * *